United States Patent [19]

Allen et al.

[11] 3,971,336

[45] July 27, 1976

[54] CONTROL SYSTEM FOR CONTROLLING TRANSLATION SPEED OF CARRIAGE WITH RESPECT TO ROTATIONAL SPEED OF MANDREL

[75] Inventors: Richard W. Allen, Temperance, Mich.; Raymond E. Bond, Newbury, Ohio; Richard T. Saba, South Bend, Ind.

[73] Assignee: Owens-Corning Fiberglas Corporation, Toledo, Ohio

[22] Filed: June 27, 1975

[21] Appl. No.: 591,240

[52] U.S. Cl. .................................... 118/8; 118/321
[51] Int. Cl.² .................. B05C 11/10; B05B 13/02
[58] Field of Search .................. 118/7, 8, 319, 320, 118/321, 322; 220/83; 264/109; 425/135, 141; 427/8, 9

[56] References Cited
UNITED STATES PATENTS

| | | | |
|---|---|---|---|
| 3,412,891 | 11/1968 | Bastone et al. | 220/83 |
| 3,609,829 | 10/1971 | Carrell et al. | 118/320 X |
| 3,711,312 | 1/1973 | Yoshida et al. | 118/8 |
| 3,739,747 | 6/1973 | Sullivan | 118/320 |
| 3,889,472 | 6/1975 | Guillaud | 118/7 |

Primary Examiner—Louis K. Rimrodt
Attorney, Agent, or Firm—John W. Overman; Paul J. Rose

[57] ABSTRACT

A reciprocable carriage carries means for dispensing hardenable liquid resin and reinforcing glass fiber material on a rotatable mandrel to produce a tank wall. The control system includes means for maintaining the carriage speed constantly proportional to the mandrel speed to produce a cylindrical portion of a tank wall and means for continuously changing the carriage speed at a constant rate with respect to the mandrel speed to produce a conical portion of a tank wall.

10 Claims, 1 Drawing Figure

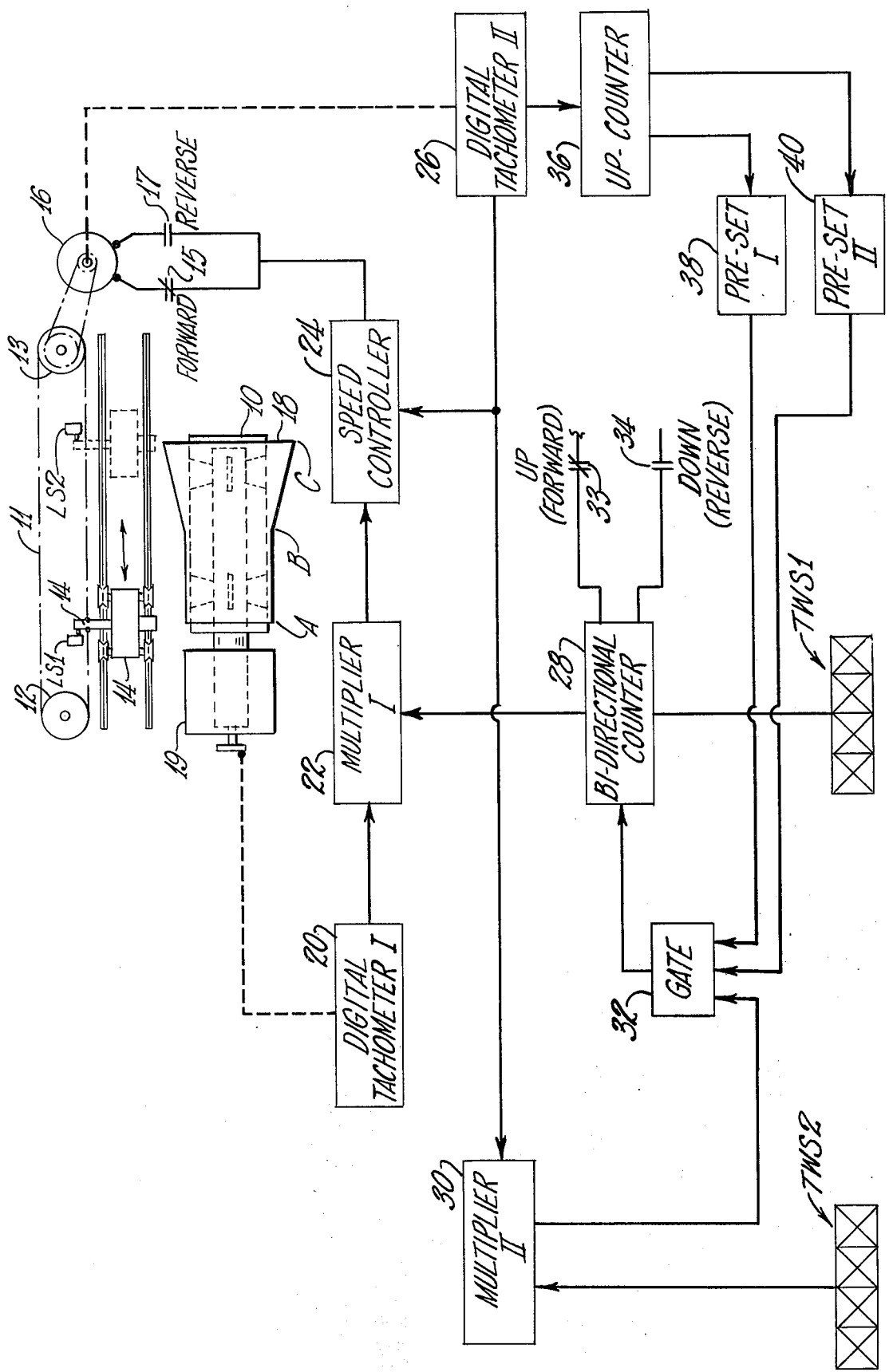

CONTROL SYSTEM FOR CONTROLLING TRANSLATION SPEED OF CARRIAGE WITH RESPECT TO ROTATIONAL SPEED OF MANDREL

This invention relates generally to machines for producing essentially cylindrical, plastic tank walls reinforced with glass fibers, and more particularly to a control system for a motor for driving a reciprocable carriage, the motor being controlled in accordance with the rotational speed of a mandrel associated with the carriage and the control system being programmable to effect the production of tapered tank walls of varying thickness.

An object of the invention is to provide a control system for a motor which drives a reciprocable carriage having a rotatable mandrel associated therewith, whereby the carriage driving motor is controlled in accordance with the rotational speed of the mandrel.

Another object is to provide such a control system for a reinforced plastic tank wall producing machine, the control system being programmable to effect the producing of tapered tank walls of varying thickness.

These and other objects of the invention will become apparent when the following specification is considered along with the accompanying drawings which includes a schematic view of a rotatable mandrel and a reciprocable carriage of a machine for producing essentially cylindrical tank walls of hardened resin reinforced with glass fibers, a tank wall with a tapered portion of varying thickness being shown on the mandrel, and a control or signal flow diagram showing an exemplary embodiment of the control system of the invention.

In the drawing, a rotatable mandrel 10 is schematically shown. In actual practice, the mandrel 10 is driven by a hydraulic motor operatively connected to the mandrel through reduction gearing enclosed in a housing 19. A carriage 14 provided with wheels mounted on tracks is reciprocable longitudinally of the mandrel 10 by a chain and sprocket drive including a chain 11 and a pair of sprockets 12 and 13. The carriage 14 is provided with means for dispensing hardenable liquid resin and reinforcing glass fiber material on the mandrel 10 as more fully shown and described in U.S. Pat. No. 3,412,891, particularly in FIG. 22 thereof, to form a tank wall. The carriage 14 is engageable at opposite ends of its travel span respectively with a pair of limit switches LS1 and LS2. A reversible direct-current motor 16 (FIG. 2) drives the sprocket 13 through reduction gearing and a clutch (not shown).

In accordance with the invention, control of the ratio of the rotational speed of the mandrel 10 to the translational speed of the carriage 14 enables both the thickness and the profile of a tank wall to be determined. By tapering the profile of the tank wall at the external surface, advantage can be taken of the fact that a vertical storage tank for liquids need not have as thick a wall at the top as at the bottom. This allows a reduction in the amount of costly resin required. As an illustration, in the drawing a generally cylindrical tank wall 18 is shown, a portion thereof extending from a point A to a point B having an external surface parallel to the rotational axis of the mandrel 10 and a portion thereof from the point B to a point C having an outwardly tapered external surface.

A first digital or pulse tachometer 20 is shown in operative association with the mandrel 10 for sensing the rotation thereof and generating a digital signal, a certain number of pulses for each revolution, for reception by a first multiplier 22. The multiplier 22 supplies a digital signal to a motor speed controller 24 for the carriage driving motor 16.

The multiplier 22 is a conventional, general purpose multiplier capable of providing an output pulse train or digital signal that is a decimal fraction of an input digital signal. The speed controller 24 converts the digital signal from the multiplier 22 into a corresponding magnitude of voltage to control the speed of the reversible direct-current motor 16.

A second digital or pulse tachometer 26 senses the rotation of the motor 16 and supplies a digital signal to the speed controller 24 is a conventional closed loop with negative feedback.

The ratio between the digital input signal and the digital output signal for the multiplier 22 is adjustable by means of a first thumb wheel switch TWS1 acting through a bi-directional counter 28. Adjustment of the thumb wheel switch TWS1 thus sets the speed of the carriage driving member 16 with reference to the rotational speed of the mandrel 10.

The bi-directional counter 28 is also under the control of a second multiplier 30 when a gate 32 is enabled, thereby effecting continuous changes in the multiplier 22 and in the speed of the carriage driving motor 16 with respect to the rotational speed of the mandrel 10 when a tapered tank wall, such as the portion of the tank wall 18 from point B to point C, is to be produced. The second multiplier 30 receives a digital input signal from the second digital tachometer 26 and supplies a digital output signal to the bi-directional counter 28 when the gate 32 is enabled. The ratio between the digital input signal and the digital output signal for the second multiplier 30 is adjustable by means of a second thumb wheel switch TWS2 to vary the amount or slope of the taper produced in a tapered tank wall portion such as the portion of the tank wall 18 from point B to point C.

The bi-directional counter 28 reduces the decimal factor of the first multiplier 22 to effect a reduction in the speed of the carriage driving motor 16 with respect to the rotational speed of the mandrel 10 when it is in an up-count mode of operation with an up or forward set of contacts 33 closed, and increases the decimal factor of the first multiplier 22 to effect an increase in the speed of the carriage driving motor 16 with respect to the rotational speed of the mandrel 10 when it is in a down-count mode of operation with a down or reverse set of contacts 34 closed. The sets of contacts 33 and 34 are interlocked in such a manner that when one set is closed, the other is opened.

The second digital tachometer 26 also sends a digital signal to an up-counter 36 controlling a first pre-set counter 38 and a second pre-set counter 40. At a pre-selected count the first pre-set counter 38 enables the gate 32 and at a higher pre-selected count the second pre-set counter 40 inhibits the gate 32.

OPERATION

A forward movement of the carriage begins and a reverse movement ends with the carriage 14 at the left-hand end of the mandrel 10 as shown in the drawing and the limit switch LS1 closed. A relay (not shown) actuated upon the closing of the limit switch LS1 closes a set of forward contacts 15 and opens a set of reverse contacts 17 for the carriage driving motor 16. Another relay (not shown) actuated upon the closing of the limit switch LS1 closes the forward contacts 33 and opens the reverse contacts 34 of the bi-directional counter 28, placing it in readiness to operate in an up-count mode when the gate 32 is enabled. The closing of the limit switch LS1 also reacts the up-counter 36 and pre-set counters 38 and 40 back to zero and the bi-directional counter 28 back to the count set in by the thumb wheel switch TWS1, by conventional means (not shown), to eliminate cumulative errors in the formation of the tank wall 18.

The motor 16 drives the carriage 14 toward the right as shown in the drawing from the point A to the point B at a speed which is constantly proportional to the rotational speed of the mandrel 10 in accordance with the setting of the multiplier 22 by the thumb wheel switch TWS1 and the bi-directional counter 28 to lay down a layer of uniform thickness in the formation of the tank wall 18.

At the point B, determined by the pre-selected number of pulses received by the pre-set counter 38 from the second digital tachometer 26, the pre-set counter 38 enables the gate 32. The bi-directional counter 28 then begins to accumulate pulse counts from the second multiplier 30 to continuously change the decimal factor setting of the multiplier 22 at a rate determined by the setting of the second thumb wheel switch TWS2. From the point B to the point C, the motor 16 drives the carriage 14 at a speed which continuously decreases with respect to the rotational speed of the mandrel 10 to lay down a layer of increasing thickness, in rightward direction, in the formation of the tank wall 18.

At the point C, the carriage 14 closes the limit switch LS2 to actuate relays and open the forward contacts 15 of the motor 16, close the reverse contacts 17, open the forward contacts 33 of the bi-directional counter 28, and close the reverse contacts 34. The motor 16 drives the carriage 14 toward the left as shown in the drawing from the point C to the point B. The bi-directional counter 28, in a countdown mode, deducts the pulse counts received from the second multiplier 30 to continuously change the decimal factor setting of the multiplier 22 at the rate determined by the setting of the second thumb wheel switch TWS2. From the point C to the point B, the motor 16 drives the carriage 14 at a speed which continuously increases with respect to the rotational speed of the mandrel 10 to lay down a layer of decreasing thickness, in a leftward direction, in the formation of the tank wall 18.

At the point B, determined this time by the pre-selected number of pulses received by the pre-set counter 40 from the second digital tachometer 26, the pre-set counter 40 inhibits the gate 32. The motor 16 then drives the carriage 14 toward the left as shown in the drawing from the point B to the point A at a speed which is again constantly proportional to the rotational speed of the mandrel 10 in accordance with the setting of the multiplier 22 by the thumb wheel switch TWS1 and the bi-directional counter 28 to lay down a layer of uniform thickness in the formation of the tank wall 18. The reciprocation of the carriage 14 continues until the tank wall 18 has been built up to the thickness desired.

Various modifications may be made in the control system shown and described without departing from the spirit and scope of the invention as set forth in the appended claims. The second limit switch LS2 may be replaced by a pre-set counter set midway between the pre-selected pulse counts for the pre-set counters 38 and 40.

The invention is claimed as follows:

1. A control system for a machine having a rotatable mandrel, a carriage reciprocable axially of the mandrel, and a reversible variable-speed motor operatively connected to the carriage for reciprocally driving the carriage, the control system comprising:
   a. first sensing means for sensing rotation of the mandrel,
   b. adjustable means for controlling the speed of the motor in accordance with the rotational speed of the mandrel as sensed by the first sensing means,
   c. second sensing means for sensing rotation of the motor as an indication of translational movement of the carriage, and
   d. adjusting means for continuously adjusting the adjustable means in accordance with the rotation of the motor sensed by the second sensing means to continuously adjust the speed of the motor with respect to the rotational speed of the mandrel.

2. A control system as claimed in claim 1 including:
   a. means controlled by the second sensing means for enabling the adjusting means when the carriage is at a certain point and moving in one direction, and
   b. means controlled by the second sensing means for inhibiting the adjusting means when the carriage is at the certain point and moving in the other direction.

3. A control system as claimed in claim 1 wherein the adjusting means is also adjustable to change the rate at which it continuously adjusts the adjustable means to thereby change the rate at which the speed of the motor is continuously adjusted.

4. In a machine for producing tank walls of glass fiber reinforced plastic, the machine including a rotatable mandrel, a carriage reciprocable axially of the mandrel and carrying means for dispensing hardenable liquid resin and reinforcing glass fiber material on the mandrel, and a reversible variable-speed motor operatively connected to the carriage for reciprocally driving the carriage, a control system comprising:
   a. first sensing means for sensing rotation of the mandrel,
   b. adjustable means for controlling the speed of the motor and carriage in accordance with the rotational speed of the mandrel as sensed by the first sensing means to produce a layer of uniform thickness in the formation of a tank wall on the mandrel,
   c. second sensing means for sensing rotation of the motor as an indication of translational movement of the carriage, and
   d. adjusting means for continuously adjusting the adjustable means in accordance with the rotation of the motor sensed by the second sensing means to continuously adjust the speed of the motor and carriage with respect to the rotational speed of the mandrel to produce a layer of increasing thickness when the carriage is moving in one direction and a layer of decreasing thickness when the carriage is moving in the other direction in the formation of a tapered tank wall portion of varying thickness on the mandrel.

5. A control system as claimed in claim 4 including:
   a. means controlled by the second sensing means for enabling the adjusting means when the carriage is at a certain point and moving in one direction, and b. means controlled by the second sensing means for inhibiting the adjusting means when the carriage is at the certain point and moving in the other direction.

6. A control system as claimed in claim 4 wherein the adjusting means is also adjustable to change the rate at which it continuously adjusts the adjustable means to thereby change the rate at which the speed of the motor is continuously adjusted and the amount of taper in the formation of a tapered tank wall portion of varying thickness.

7. In a machine for producing tank walls of glass fiber reinforced plastic, the machine including a rotatable mandrel, a carriage reciprocable axially of the mandrel and carrying means for dispensing hardenable liquid resin and reinforcing glass fiber material on the mandrel, and a reversible variable-speed motor operatively connected to the carriage for reciprocally driving the carriage, a control system comprising:
 a. a first digital tachometer for sensing rotation of the mandrel and generating a digital output signal in accordance with the amount of rotation sensed,
 b. a first multiplier for receiving the digital output signal from the first digital tachometer and providing a digital output signal,
 c. a speed controller for receiving the digital output signal from the first multiplier and converting it into a corresponding magnitude of voltage to control the speed of the motor in accordance with the rotational speed of the mandrel as sensed by the first digital tachometer to produce a layer of uniform thickness in the formation of a tank wall on the mandrel,
 d. a second digital tachometer for sensing rotation of the motor as an indication of translational movement of the carriage and generating a digital output signal in accordance with the amount of rotation sensed,
 e. a second multiplier for receiving the digital output signal from the second digital tachometer and providing a digital output signal, and
 f. a bi-directional counter for receiving the digital output signal from the second multiplier and providing an output signal to the first multiplier to continuously adjust the digital output signal from the first multiplier in accordance with the rotation of the motor sensed by the second digital tachometer and thereby continuously adjust the speed of the motor and carriage with respect to the rotational speed of the mandrel to produce a layer of increasing thickness when the carriage is moving in one direction and a layer of decreasing thickness when the carriage is moving in the other direction in the formation of a tapered tank wall portion of varying thickness on the mandrel.

8. A control system as claimed in claim 7 including:
 a. a gate for selectively enabling and inhibiting the digital output signal from the second multiplier,
 b. a first pre-set counter for receiving the digital output signal from the second digital tachometer and providing an output signal to enable the gate when the carriage is at a certain point and moving in one direction, and
 c. a second pre-set counter for receiving the digital output signal from the second digital tachometer and providing an output signal to inhibit the gate when the carriage is at the certain point and moving in the other direction.

9. A control system as claimed in claim 7 wherein the first multiplier is adjustable by a thumb wheel switch acting through the bi-directional counter.

10. A control system as claimed in claim 7 wherein the second multiplier is adjustable by a thumb wheel switch to vary the amount of taper in the formation of a tapered tank wall portion of varying thickness.

* * * * *